A. E. SCHATZ.
Whiffletree.
No. 207,686. Patented Sept. 3, 1878.
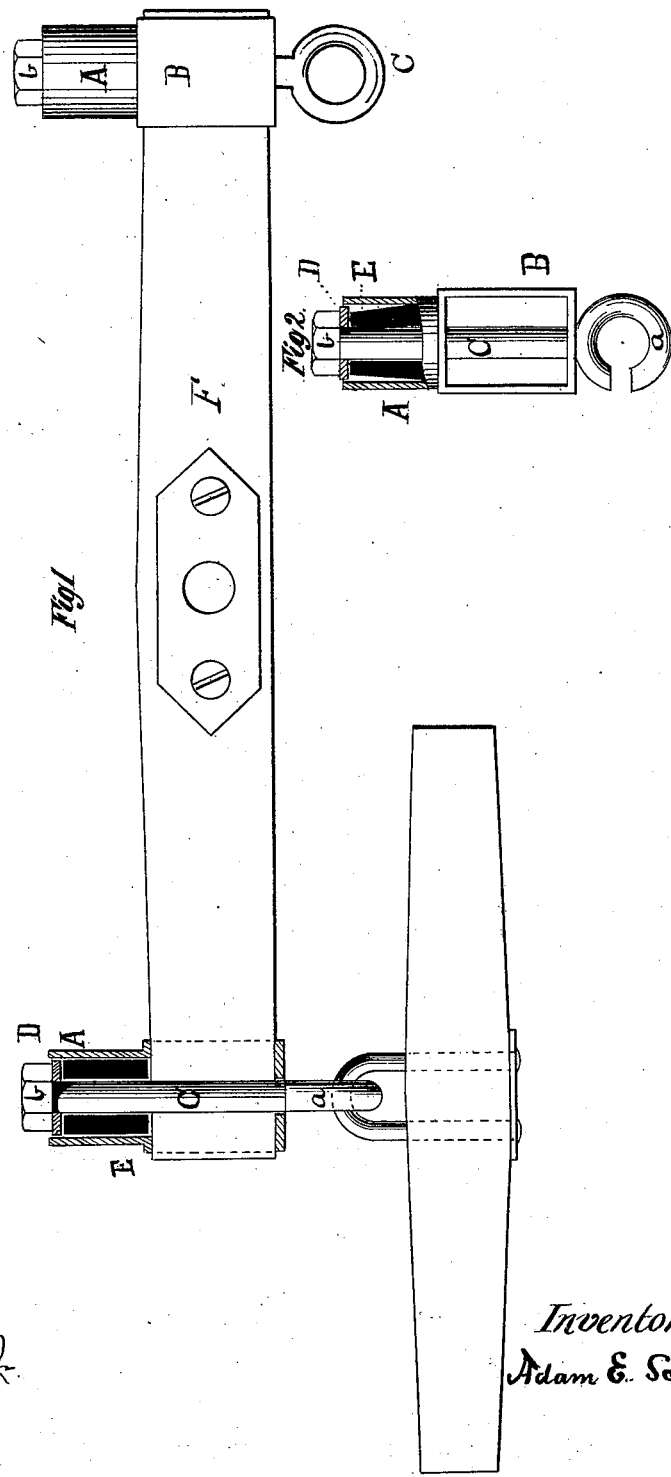
Witnesses:
George Weist Jr.
Ther P. Anderson
Inventor:
Adam E. Schatz

UNITED STATES PATENT OFFICE.

ADAM E. SCHATZ, OF NEW YORK, N. Y.

IMPROVEMENT IN WHIFFLETREES.

Specification forming part of Letters Patent No. 207,686, dated September 3, 1878; application filed May 3, 1878.

*To all whom it may concern:*

Be it known that I, ADAM E. SCHATZ, of the city, county, and State of New York, have invented a new and useful Improvement in Easy Starters, which improvement is fully set forth in the following specification and the accompanying drawing, in which latter—

Figure 1 represents a whiffletree to which is attached an easy starter as constructed by me, showing a transverse section of the starter. Fig. 2 represents a side view, showing the hooked pull-piece and a section of the receptacle cut away to show the interior arrangement.

Similar letters represent like parts.

The object of my invention is to provide an easy starter to be attached to a whiffletree or other part of a vehicle, and is intended to absorb the shock occasioned by the sudden starting of a vehicle, whereby the animals attached to the vehicle are injured by reason of sore and lacerated shoulders caused by the shock, and also to prevent the strain on the running-gear of vehicles. The greatest benefit may be derived by attaching the starter to heavily-laden vehicles, inasmuch as they present the greatest resistance at the start. Whenever it is necessary to start a loaded vehicle, the animal throws its whole weight with all its strength forward. There being no attachment calculated to absorb the shock, the whole force of the shock is spent on the animal's shoulders, the harness, and the woodwork of the running-gear, and unavoidably injures the animals and strains or breaks the two latter. The device may be attached to either the ends of single whiffletrees, to which there is only one animal attached, or to the ends of the main whiffletree, or the central portion of either, or to the running-gear or other portion of a vehicle, wherever it may be desired.

In the drawing, A is a receptacle, preferably a cylinder, which is intended to receive the springs. B is a shackle or band attached to the receptacle, both being preferably made in one piece, and is provided for the purpose of attaching the starter to the whiffletree, &c. C is a pull-piece or rod, provided at one end with an eye or hook, *a*, and at the other a screw-thread or other device for fastening a nut or stop, *b*. D is a washer set between the nut and spring and fitting into the end of the receptacle. E is a spring, made of rubber, preferably of a conical shape, or it may be of the form shown in Fig. 1. The spring, when made of conical shape, on account of its elastic properties, serves better to gradually break the force of starting. Said spring has a hole running through it from end to end for the purpose of allowing the pull-piece C to be passed through it. F is a whiffletree.

In practice, I affix the device or starter to the whiffletree, with the spring preferably toward the wagon. I then insert the spring with its apex next the washer D. The pull-piece or rod C is then passed through a hole provided for that purpose in the end of the band B and through a hole in the whiffletree, passing through the rubber; then the washer D is placed in position and the nut *b* fastened. The traces may then be attached by ordinary means.

Where it becomes necessary to unhitch or hitch rapidly, as in the various fire departments, I affix a hook with a spring-stop instead of an eye to the end of the pull-piece, thus allowing the smaller or single whiffletree to always remain attached to the traces, and allow of the hooking and unhooking by means of a ring attached to the small whiffletree. The device may also be attached to a pole of a truck to avoid the shock caused by the swinging of the same.

It is obvious that the band or shackle serves to strengthen the whiffletree, and the rod or pull-piece serves to retain the starter in place.

When it becomes desirable to attach the starter to the running-gear, I provide the receptacle with suitable means for fastening the same and set the receptacle toward the animals.

Having described my invention, what I claim as new, and desire to secure by Letters Patent, is—

In an easy starter, the combination, with the whiffletree F, of the rubber spring E, the receptacle or cylinder A, provided with the band B, the pull-rod C, provided at one end with an eye or hook, *a*, and at the other with a nut, *b*, and a washer, D, substantially as described, and for the purpose set forth.

Dated New York, January 16, 1878.

ADAM E. SCHATZ.

Witnesses:
GEORGE WURST, Jr.,
AUGUST BEHRENS.